US011921719B1

(12) United States Patent
Alhamid et al.

(10) Patent No.: US 11,921,719 B1
(45) Date of Patent: Mar. 5, 2024

(54) AUTOMATED QUERY SELECTIVITY PREDICTIONS USING QUERY GRAPHS

(71) Applicant: International Business Machines Corporation, Armonk, NY (US)

(72) Inventors: Mohammed Fahd Alhamid, Stouffville (CA); Vincent Corvinelli, Mississauga (CA); Calisto Zuzarte, Pickering (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/931,963

(22) Filed: Sep. 14, 2022

(51) Int. Cl.
*G06F 16/24* (2019.01)
*G06F 16/2453* (2019.01)

(52) U.S. Cl.
CPC ............................. *G06F 16/24544* (2019.01)

(58) Field of Classification Search
CPC .................................................. G06F 16/2246
See application file for complete search history.

(56) References Cited

U.S. PATENT DOCUMENTS

| | | | | |
|---|---|---|---|---|
| 5,930,795 | A * | 7/1999 | Chen | G06F 16/2448 |
| 10,303,688 | B1 * | 5/2019 | Sirin | G06N 5/01 |
| 10,643,132 | B2 | 5/2020 | Corvinelli et al. | |
| 10,942,923 | B1 | 3/2021 | Zhang et al. | |
| 11,030,521 | B2 | 6/2021 | Corvinelli et al. | |
| 11,416,487 | B2 * | 8/2022 | Zhu | G06N 20/00 |
| 11,625,398 | B1 * | 4/2023 | Bhuyan | G06F 16/24544 707/714 |
| 11,755,576 | B1 * | 9/2023 | Jiang | G06F 16/27 707/718 |
| 11,853,301 | B1 * | 12/2023 | Pandis | G06F 16/2458 |
| 2004/0010488 | A1 | 1/2004 | Chaudhuri et al. | |
| 2009/0177623 | A1 | 7/2009 | Krishna | |
| 2016/0275398 | A1 | 9/2016 | Corvinelli et al. | |
| 2017/0228425 | A1 * | 8/2017 | Kandula | G06F 16/24542 |
| 2018/0329958 | A1 * | 11/2018 | Choudhury | G06F 16/2456 |
| 2021/0056108 | A1 | 2/2021 | Shmueli et al. | |
| 2021/0406717 | A1 | 12/2021 | Tauheed et al. | |
| 2022/0004553 | A1 | 1/2022 | Corvinelli et al. | |
| 2022/0067045 | A1 | 3/2022 | Kalil et al. | |

OTHER PUBLICATIONS

International Search Report and Written Opinion for International Application No. PCT/CN2023/095233; International Filing Date: May 19, 2023; dated Sep. 13, 2023; 8 pages.

(Continued)

*Primary Examiner* — Merilyn P Nguyen
(74) *Attorney, Agent, or Firm* — CANTOR COLBURN LLP; Teddi Maranzano

(57) ABSTRACT

Examples described herein provide a computer-implemented method that includes training a machine learning model. The model is trained by generating a set of training queries using at least one of a query workload and relationships between tables in a database, building a query graph for each of the set of training queries, computing, for each training query of the set of training queries, a selectivity based at least in part on the query graph, and building, based at least in part on the set of training queries, an initial join result distribution as a collection of query graphs.

21 Claims, 11 Drawing Sheets

(56) References Cited

OTHER PUBLICATIONS

Fruchterman et al.; "Graph Drawing by Force-directed Placement"; Software-Practice and Experience; vol. 21, Iss. 11; Nov. 1991; pp. 1129-1164.

Hasan et al.; "Deep Learning Models for Selectivity Estimation of Multi-Attribute Queries"; Research 11: Machine Learning for Databases II; SIGMOD'20; Jun. 14-19, 2020; pp. 1035-1050.

Ivanov et al.; "Adaptive Cardinality Estimation"; Retrieved from arXiv:1711.08330v1 [cs.DB]; Nov. 22, 2017; 12 Pages.

Kipf et al.; "Learned Cardinalities: Estimating Correlated Joins with Deep Learning"; Retrieved from arXiv:1809.00677v2 [cs.DB] on Dec. 18, 2019; 9th Biennial Conference on Innovative Data Systems Research (CIDR'19); Jan. 13-16, 2019; 8 Pages.

Marcus et al.; "Neo: A Learned Quesry Optimizer"; Retrieved from arXiv:1904.03711v1 [cs.DB]; Apr. 7, 2019; 18 Pages.

Ortiz et al.; "An Empirical Analysis of Deep Learning for Cardinality Estimation"; Retrieved from arxiv.org/abs/1905.06425v2; Sep. 12, 2019; 17 Pages.

Tzoumas et al.; "Efficiently Adapting Graphical Models for Selectivity Estimation"; The VLDB Journal; vol. 22, No. 1; Feb. 2013; pp. 3-27.

Woltmann et al.; "Cardinality Estimation with Local Deep Learning Models"; Association for Computing Machinery; aiDM'19; Jul. 5, 2019; 8 Pages.

Yang et al.; "Deep Unsupervised Cardinality Estimation"; Retrieved from arXiv:1905.04278v2 [cs.DB]; Proceedings of the VLDB Endowment; vol. 13, No. 3; Nov. 21, 2019; pp. 279-292.

* cited by examiner

AUTOMATED QUERY SELECTIVITY PREDICTIONS USING QUERY GRAPHS

BACKGROUND

Embodiments described herein generally relate to processing systems, and more specifically, to automated query selectivity predictions using query graphs.

Query optimization is a feature that is efficient in executing a query by creating a management system in a relational database.

Structured query language (SQL) is a programming language created and designed to manage the data stored in a relational database. Structured query language (SQL) can include specific programming language that is used to manage data that is stored in a relational database management system (RDBMS).

A relational database management system (RDBMS) may typically include single column statistics that are usually collected on individual columns in a relation. A relation may include tuples or attributes that describe the relationships or the defining features in the table or a relationship between tables. For example, a relation includes data values on a table and the relational database may store the data values as relations or tables. A collection of relations or tables may be stored on a database as a relational model.

SUMMARY

In one exemplary embodiment, a computer-implemented method is provided. The method includes training a machine learning model. The model is trained by generating a set of training queries using at least one of a query workload and relationships between tables in a database, building a query graph for each of the set of training queries, computing, for each training query of the set of training queries, a selectivity based at least in part on the query graph, and building, based at least in part on the set of training queries, an initial join result distribution as a collection of query graphs.

In another exemplary embodiment, a computer-implemented method is provided. The method includes training a machine learning model. The model is trained by generating a set of training queries using at least one of a query workload and relationships between tables in a database, building a query graph for each of the set of training queries, computing, for each training query of the set of training queries, a selectivity based at least in part on the query graph, and building, based at least in part on the set of training queries, an initial join result distribution as a collection of query graphs. The method further includes, subsequent to training the machine learning model, performing inference using the machine learning model. Performing inference includes computing a join cardinality for each join statement of a query and identifying a best fit among the collection of query graphs to generate an associated cardinality estimate. The method further includes performing continuous training on the machine learning model. Performing continuous training includes compiling new queries in a new query workload using input including at least one change selected from a group consisting of new queries based on workloads, new tables, and changes to data, and updating the collection of query graphs.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
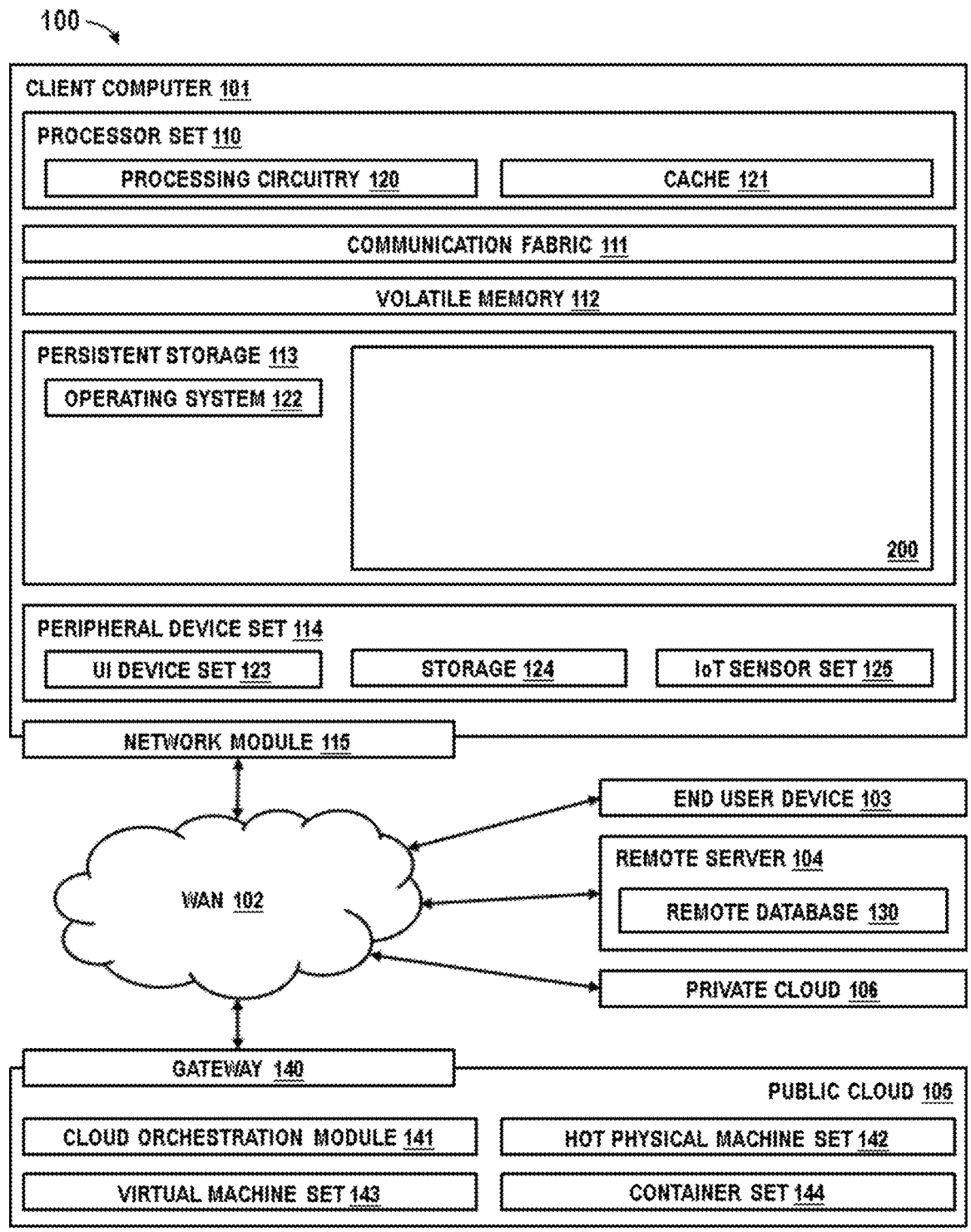
FIG. 1 depicts a block diagram of a processing system for implementing one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments described herein provide for estimating cardinality for a query using query graphs.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as estimating cardinality for a query using query graphs 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment 100 may access or manage a database, such as the remote database 130. In some embodiments, the remote database 130 can implement a relational model, which may be based on a predicate logic that may include conditions to be applied to the table or the relation. In a relational model, predicates may be assumed to be independent when computing the cardinality if the statistics on multiple columns in the table are not collected. Predicates may be typically represented in a form of ranges that require lower and upper bounds. The BETWEEN and range predicates may be formed into a separated range of values for each predicate. Equality predicates may have the lower and upper bounds to be equal. This may provide some improvement in cardinality estimation; however, the computational power to achieve an improved cardinality estimation is extensive, costly, and time intensive.

The cardinality estimation plays an important role in structured query language (SQL) optimization. Cardinality as it relates to structured query language (SQL) refers to the number of rows being processed by various operators in a query execution plan. The number of rows coming into an operator may be reduced or increased as the number of rows is processed by different operators until the final result is returned to the application or returned to the user that issued the query. This is distinct from column cardinality. Column cardinality is a statistic that refers to a number of distinct values in a column of a database table. A scan of the database table may have predicates applied that read all of the rows in the table; however, the output may only include rows that qualify the predicate condition. Cardinality estimation is a prediction of how many rows qualify the condition versus how many rows were input into the scan operator.

Cost-based optimizers may rely on cardinality estimation to compute access plans execution costs and to select an optimal access plan. A cost-based optimizer may use statistics based on table data values in a database table to identify an efficient plan for query execution for a structured query. Thus, the accuracy of the cardinality of a structured query can have an effect on the cost-based optimizers. The accuracy of cardinality contributes to an overall goal of selecting the best execution plan through the cardinality estimates. The accuracy of a cardinality estimation may be difficult, or the information required to make the process easier is expensive to collect, or both. The accuracy of cardinality is particularly difficult to achieve on tables that have correlated or skewed columns. An inaccurate cardinality estimation can lead to choosing slow access plans, unpredictable query performance, slow or unstable query performance, and/or the like, including combinations and/or multiples thereof.

Query optimization relies on the evaluation of a query access plan, which predicts an optimal access of each table and the join method and join order in the query based on some cost estimations. The selection of an optimal query access plan is highly dependent on the accuracy of cost estimation of the operators. Cardinality estimation is an element to predict such cost. In some cases, the optimization is dependent on the accuracy of such estimates. The application of the predicates in a query influences the cardinality estimation and can be split into two folds: estimating the cardinality after applying the local predicates on the base table and estimating the cardinality of the joins. Performing these estimations is typically a difficult task requiring some degree of complexity needing to take into consideration the uniformity, skewness, correlations, and the type of predicates (e.g., equality, range, negation, conjunction, disjunction, and/or the like, including combinations and/or multiples thereof). The inaccuracy of such estimation leads to sub-optimal query access plan selections that results in slow or unpredictable query performance.

Conventional optimizer technology to optimize query execution relies on some limited collected statistics. The collected statistics decompose large distributions having multiple columns into fewer parameters describing the number of distinct values, top n frequent values, and histograms of individual columns. In these cases, independency between column values for columns involved in multiple predicates is assumed and is referred to as the independence assumption. The independence assumption is useful to overcome the missing correlation information. However, if the individual columns are correlated, the estimation errors on local predicates is propagated and built up through the joins. Collecting column-group statistics or collecting detailed statistics on the join result, for example using a statistical view, can contribute to solving the estimation problem but comes at a very high tuning cost. It is hard to determine which columns are potentially useful to statistically combine together. It is also difficult to continuously collect and store such data frequently as table data is changed. For example, for each n columns, $2^n-1$ groups are needed to cover all possible combinations.

Tuning in order to get better query execution plans is often difficult as it relies on deep expertise. Conventional approaches to improve cardinality estimates range from manually run advisors to collect advances statistics to just-in-time targeted statistics collections on samples of data prior to query optimization. On-the-fly statistics collection can add to the performance overhead. An auto-column group statistics (CGS) collection done by a background daemon that could help get better estimates with multiple predicates over statistically correlated columns has been tried in some cases. In such cases, the daemon wakes up periodically (every 2 hours); however, this may be too late as queries that need this information may be run in the interim. Additionally, not all the issues are addressed with CGS such as skew or mismatches in the join column value domain where minimal statistics may not overcome the assumptions made when computing join predicate cardinality estimates.

Relying on some assumptions to predict the joint distribution of multiple relations often results in significant cardinality estimation errors. Independence, uniformity, and inclusion assumptions are just three examples that contribute to these errors. This could result in very poor query performance. In addition, sampling on the join columns can quickly end up with the known problem of 0-tuple join results (for example, collecting statistics by joining independently collected samples that do not correlate on the join predicate columns).

Efforts have been made to address some of these issues using machine learning (ML). ML has shown the potential to outperform the statistical-based estimation functions to estimate predicate/join/query cardinalities. Learning models can achieve better performance over statistical-based methods.

One such approach proposed a learning model to learn single and join-crossing table. This approach captures the correlated columns in single or multiple tables. The learning model used is a deep learning neural network built in a form of multi-set convolutional network. The learning model uses materialized samples to encode each query. Each query is expressed as features according to three main sets. This approach provides for estimating the cardinality of the whole query. The queries are executed against the database to obtain the actual cardinalities. However, this approach is highly dependent on materialized samples from each table in the database and requires the identification of columns and tables through encoding. This makes training very specific to named tables and columns and cannot be generalized to unseen tables or columns.

Another approach samples the data to reduce the overhead of estimating range predicates and approximate the joint data distribution. However, sampling the data on the fly for each range predicate and feeding them to the model to estimate their densities to sum the result is very expensive in terms of processing and memory loads and is not practical.

Another approach proposes the use of machine learning to estimate the query cardinality. This approach relies on statistics from previously executed queries. Actual cardinalities are learned from the query structure where predicates are represented by the participating columns and associated operators. However, this approach assumes the workload is static and there is only one correct answer for each query structure.

Another approach proposes the use of machine learning for cardinality estimation over the use of basic neural networks, recurrent neural networks, and random forest. The proposed model uses single dimensional vectors: relations, predicates, and join predicates. Literals found in the queries are normalized into values between 0 and 1. Join predicates are encoded with one-hot encoding. The overall objective is to let the model learn the selectivity of the join operations. However, this approach causes substantial overhead when building the model as the building of the model is computationally expensive and time consuming in terms of processing and memory loads.

Another approach proposes to create smaller models on subsets of joins. In this approach, only 2 and 3-way joins were trained on those specific joins only, capturing different combinations of local predicates. This approach has not been generalized to any 2, 3, n-way joins.

Yet another approach proposes to use deep neural networks to build query execution plans by continuously learning from previously executed queries. This method learns the correlations through word similarities in the data which can produce a model. This approach is limited in generalization to columns that were unseen during training.

In an effort to cure these and other shortcomings, one or more embodiments described herein provide for using machine learning models to learn the selectivity of a full query. Learning the selectivity of a full query can then be used to predict more accurate cardinality estimates for any access plan, for sub-portion plans, and/or for any query that applies join predicates. The ML models learn from the training workload and improve their prediction accordingly. One or more embodiments described herein provide improved robustness to learn from a few examples represented in different distributions and to generalize the prediction over unseen tables/queries. This approach provides for handling multiple tables, with multiple join columns, and with multiple local predicates.

One or more embodiments described herein uses machine learning to approximate a multivariate resulting query cardinality after applying local and join predicates. To achieve this, a query graph representation of the query properties is generated. The query graph representation (or simply "query graph") is an n-dimensional representation of nodes. The nodes represent the relational database tables. By representing the query in a form of a query graph, the machine learning model can learn the query and produce the associated predicted cardinality. The resulting query graph is robust to handle local and join predicates and is normalized to represent tables and joins with properties such that it is not dependent on table names and column names. One or more embodiments described herein provides for retraining, for example, by providing the ability to incrementally learn with the addition of new tables and workload. One or more embodiments described herein provides for retraining, for example, by running a cumulative training workload for a full model retraining.

One or more embodiments described herein that learn the join cardinality provides one or more advantages over existing machine learning models. One or more embodiments described herein provides the ability to learn the join result distribution. For example, one or more embodiments enables the learning models to understand the distribution properties of multiple relations in a given query graph, avoids the need to leverage multi-column statistics or collecting statistical views or materialized query tables (also known as materialized views), and/or provides further benefit for pair-wise join correlation with any local predicates and with other pair-wise joins.

One or more embodiments described herein provides generalization. For example, one or more embodiments of using query graphs provides for avoiding encoding the tables, joins, or the columns having local or join predicates. In this way, the model learns the various properties of queries joining multiple relations while generalizing on new created tables or new query on unseen join columns. Additionally, or alternatively, if the underlying distribution of a relation has changed overtime, the learning model does not associate the encoding of the specific tables, columns, and join as used during training but rather on the properties of the new distribution.

One or more embodiments described herein provides feature decomposition. For example, a query graph provides for defining nomenclature of how to plot the nodes in a multidimensional graph (the query graph). The query graph provides for the queries to be encoded with multiple features rather than sequentially lining the queries as inputs to the model, which can grow the number of features of n-table queries significantly.

One or more embodiments described herein provides for enabling an ensemble architecture. For example, according to one or more embodiments, the graph-based approach provides for multiple models to work collaboratively to enhance accuracy of the use of the model.

Figure 2:
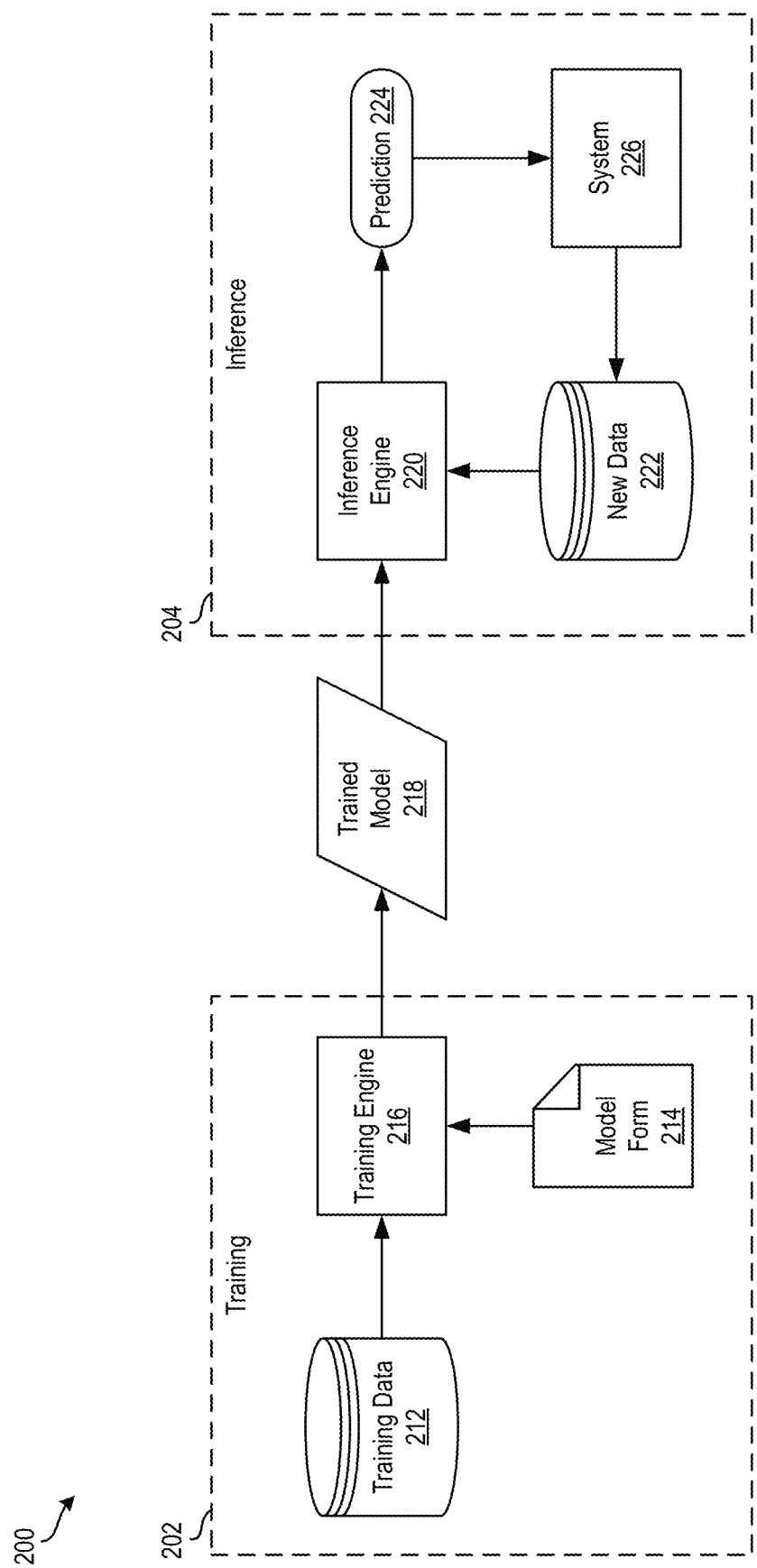
FIG. 2 depicts a block diagram of components of a machine learning training and inference system according to one or more embodiments described herein.

Turning now to FIG. 2, one or more embodiments described herein can utilize machine learning techniques to perform tasks, such as estimating cardinality for a query using query graphs. More specifically, one or more embodiments described herein can incorporate and utilize rule-based decision making and artificial intelligence (AI) reasoning to accomplish the various operations described herein, namely estimating cardinality for a query using query graphs. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for estimating cardinality for a query using query graphs, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of estimating cardinality for a query using query graphs as described herein.

Systems for training and using a machine learning model are now described in more detail with reference to FIG. 2. Particularly, FIG. 2 depicts a block diagram of components of a machine learning training and inference system 200 according to one or more embodiments described herein. The machine learning training and inference system 200 performs training 202 and inference 204. During training 202, a training engine 216 trains a model (e.g., the trained model 218) to perform a task, such as to estimate cardinality for a query using query graphs. Inference 204 is the process of implementing the trained model 218 to perform the task, such as to estimate cardinality for a query using query graphs, in the context of a larger system (e.g., a system 226). All or a portion of the machine learning training and inference system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes queries from a query workload. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as to estimate cardinality for a query using query graphs. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the trained model 218 has not been exposed. The inference engine 220 makes a prediction 224 (e.g., a classification of an object in an image of the new data 222) and passes the prediction 224 to the system 226 (e.g., the computing environment 100 of FIG. 1). The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the prediction 224 generated by the inference engine 220 is periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figure 3:
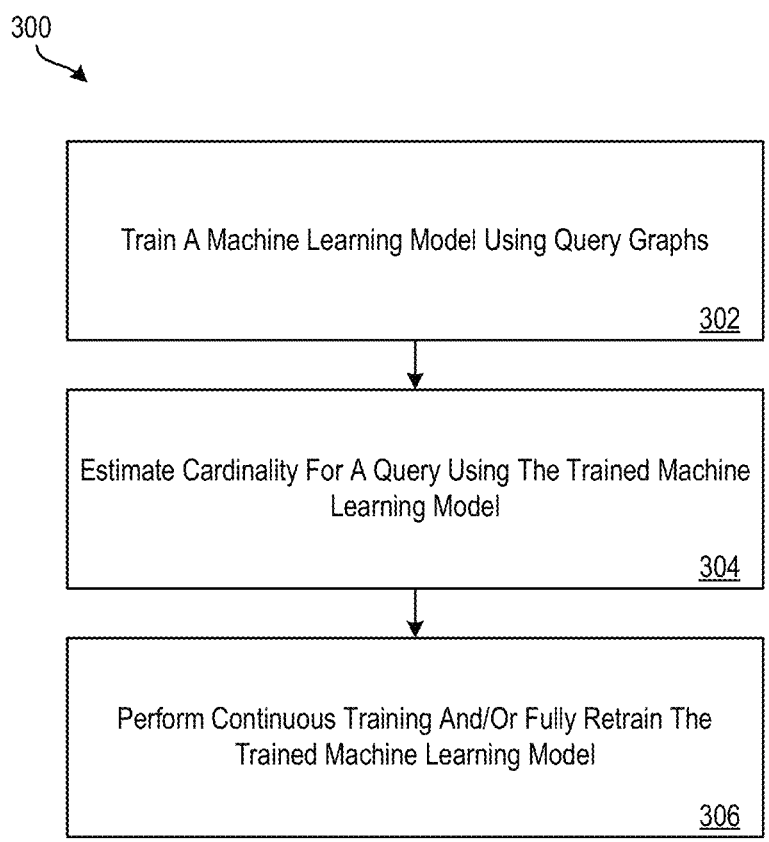
FIG. 3 depicts a method for estimating cardinality for a query using query graphs according to one or more embodiments described herein.

FIG. 3 depicts a method 300 for estimating cardinality for a query using query graphs according to one or more embodiments described herein. The method 300 can be performed by any suitable system, environment, and/or device, such as the computing environment 100, the machine learning training and inference system 200, and/or the like, including combinations and/or multiples thereof. The method 300 is now described in more detail with reference to at least FIG. 2 but is not so limited.

At block 302, a processing system (e.g., the computing environment 100, the machine learning training and inference system 200, and/or the like, including combinations and/or multiples thereof) trains a machine learning model (e.g., the trained model 218) using query graphs. To train the machine learning model, the processing system generates training queries from a query workload or generates training queries based on relationships between tables in a database, and/or receives such training queries. Using a query from the training queries, the processing system builds a query graph using an input vector that anonymizes tables in the database by using a representation of characteristics of the database and provides selectivity as a desired output (e.g., using the representation of the query as the graph). The processing system then builds, from the training queries, an initial join result distribution as a collection of query graphs.

Training the machine learning model (e.g., the trained model 218) is now described in more detail. The training data (e.g., the training data 212) can be, progressively, generated using a collected query workload. If the collected query workload is not available initially, a synthetic workload against the database can be generated and used. The generated queries can be joint queries based on defined relationships in the database with random local predicates. Workload queries, if collected, can be simplified to the join portions of the query along with local predicates.

The training engine 216 takes as input a vector that includes the dimensions of each node in the query graph. According to an embodiment, the positioning of the nodes is based on geometry rules established in the graph representation described herein. For the encoding of the node features, such as base-table selectivity, join-sample selectivity, and top-frequent-value selectivity, randomly collected samples can be scanned. Training does not require any non-random sampling techniques to maintain high quality estimations. However, according to one or more embodiments described herein, if traces are available from the workload queries that were previously run, the selectivity can be obtained from these. For a well-defined star schema, a sample of the fact table joined to the full dimension tables produces improved results compared to independent samples. Accurate results can be achieved without a sample of the fact table joined to the full dimension tables at the cost of increased training time.

According to one or more embodiments described herein, any suitable number of training data can be used to train the trained model 218. According to an embodiment, the number of training data can depend on relevance to the workload. A training accuracy threshold along with model size or training time can be implemented to guide the amount of training data needed according to an embodiment. Additionally and/or alternatively, as the workload is run, a run-time feedback of predicted estimates versus actual cardinality can be used to continuously train or retrain the model as described herein.

Once the training 202 has been performed (e.g., once the trained model 218 is trained by the training engine 216), the inference 204 can begin. At block 304, the processing system estimates a cardinality for a query using the trained machine learning model from block 302. In other words, the processing system performs inference using the trained machine learning from block 302. For example, for each join enumerated, an optimizer calls the trained machine learning model to compute a join cardinality. The optimizer enumerates different permutations for the same set (or subset) of N tables. According to an example, the cardinality is the same, so the prediction is computed once, cached, and reused as needed, resulting in improved functioning of the processing system. The trained machine learning model identifies a best fit among the collection of query graphs and produces an associated cardinality estimate for the best fit, the cardinality estimate being returned to the optimizer.

Inference 204 begins upon the receipt of a query by the inference engine 220 (also referred to as an "optimizer" or "database optimizer"). Once a query is received by the database optimizer, the optimizer enumerates various permutations of join orders. For each of these join orders, the optimizer constructs the input vector that describes the join graph along with one or more characteristics, which are further described herein. The inference engine 220 matches the pattern among the available patterns of the input vector and the query graph and applies the learning model to produce the associated predicted cardinality (e.g., the prediction 224).

According to one or more embodiments described herein, the optimizer can enumerate different permutations of join orders for the same set (or subset) of N tables, but the resulting cardinality for each join order is the same. To minimize any computational load (e.g., processing and/or memory) overhead of constructing the input vector and/or computing a prediction using the model, prediction results can be computed once for a set of N tables and cached for later re-use.

In order to compute intermediate cardinalities with a subset of tables (e.g., for each join order enumerated), the inference engine 220 can apply the trained model 218 using subsets of the tables and the tables' local predicates to generate improved cardinalities on the join of these tables. For example, a query could have five tables where two of the five tables are look up joins (N:1). In this example, the trained model 218 predicts the cardinality for just the joins of the other three tables that are primarily filtering joins. The cardinality does not change after joining the look-up tables. This reduces the size and complexity of the query graphs and also reduces the training queries needed to train the machine learning model.

It should be appreciated that, during the inference 204, the table and column distribution properties may not match exactly to those that are in the queries used during the training 202. If there are a sufficiently large number of tables and training scenarios, there will be sufficient tables with various distributions and predicates that the trained model 218 works even for new tables and columns that have not been exactly seen before.

At block 306, the processing system preforms continuous training and/or fully retrains the trained machine learning model from block 302. For example, new queries in a new query load can be compiled based new workloads, new tables, changed data in tables, differences in estimates predicted by the trained model relate to actual cardinality from run-time feedback, and/or the like, including combinations and/or multiples thereof. The trained machine learning model can be re-trained by adding to or revising the collection of query graphs with the new query workload.

Since databases are typically dynamic, information stored in the databases changes over time. Hence, if the underlying distributions of some of the tables change significantly over time, a full model retraining may be required (e.g., retrain the trained model 218 by performing the training 202 again). A threshold may be implemented to indicate when the underlying distribution has changed significantly (e.g., enough to justify retraining). For example, the threshold may be percentage difference between the frequency and/or histogram statistics collected for tables compared to the same when the trained model 218 was last fully trained. According to one or more embodiments described herein, the retraining is performed based on the extent of the changes (e.g., number of rows updated, deleted, and/or inserted relative to the table size, and/or the like, including combinations and/or multiples thereof). According to one or more embodiments described herein, the retraining is performed based on the number of tables created, dropped or altered in ways that affect the model (e.g., drop column, add column, and/or the like, including combinations and/or multiples thereof).

The trained model 218 can also be updated/trained continuously. With continuous training, labels for the query graph may become outdated and not reflective of the current reality anymore. Hence, the queries previously used in training can be one or more of the following scenarios. First, queries in the training set that have not executed recently. These queries still carry correct labels. Second, queries that are executed recently. These queries are added to the new query workload if they match any entry in the training set. Any hash function can be used to hash the queries in the training data 212 to discard redundant queries. Third, queries that are not in the training set and the model estimation is higher/lower by a certain amount (e.g., a threshold number, a threshold percent difference, and/or the like, including combinations and/or multiples thereof) compared to the actual cardinality (e.g., a different of an order of magnitude). These queries are added to a new query workload. Any other metric can be used as well to trigger this scenario. According to one or more embodiments described herein, the next time the model is retrained, a portion or all of those queries is added as a new set of observed examples to retrain the trained model 218.

According to one or more embodiments described herein, a run-time feedback component that shows the differences between predicted and actual cardinality can be used to indicate when the trained model 218 needs to add queries for additional continuous training or add to the training workload for full retraining.

According to one or more embodiments, the trained machine learning model provides the ability to learn a join result distribution, provides for generalization to be able to handle unseen tables and columns, provides feature decomposition, enables an ensemble architecture, and/or the like, including combinations and/or multiples thereof. Additional processes also may be included. According to one or more embodiments described herein, the method 300 is applicable to relational database and/or other database technologies such as graph databases, extensible markup language (XML) databases, and/or the like, including combinations and/or multiples thereof. it should be understood that the process depicted in FIG. 3 represents an illustration, and that other processes may be added or existing processes may be removed, modified, or rearranged without departing from the scope of the present disclosure.

Figure 4:
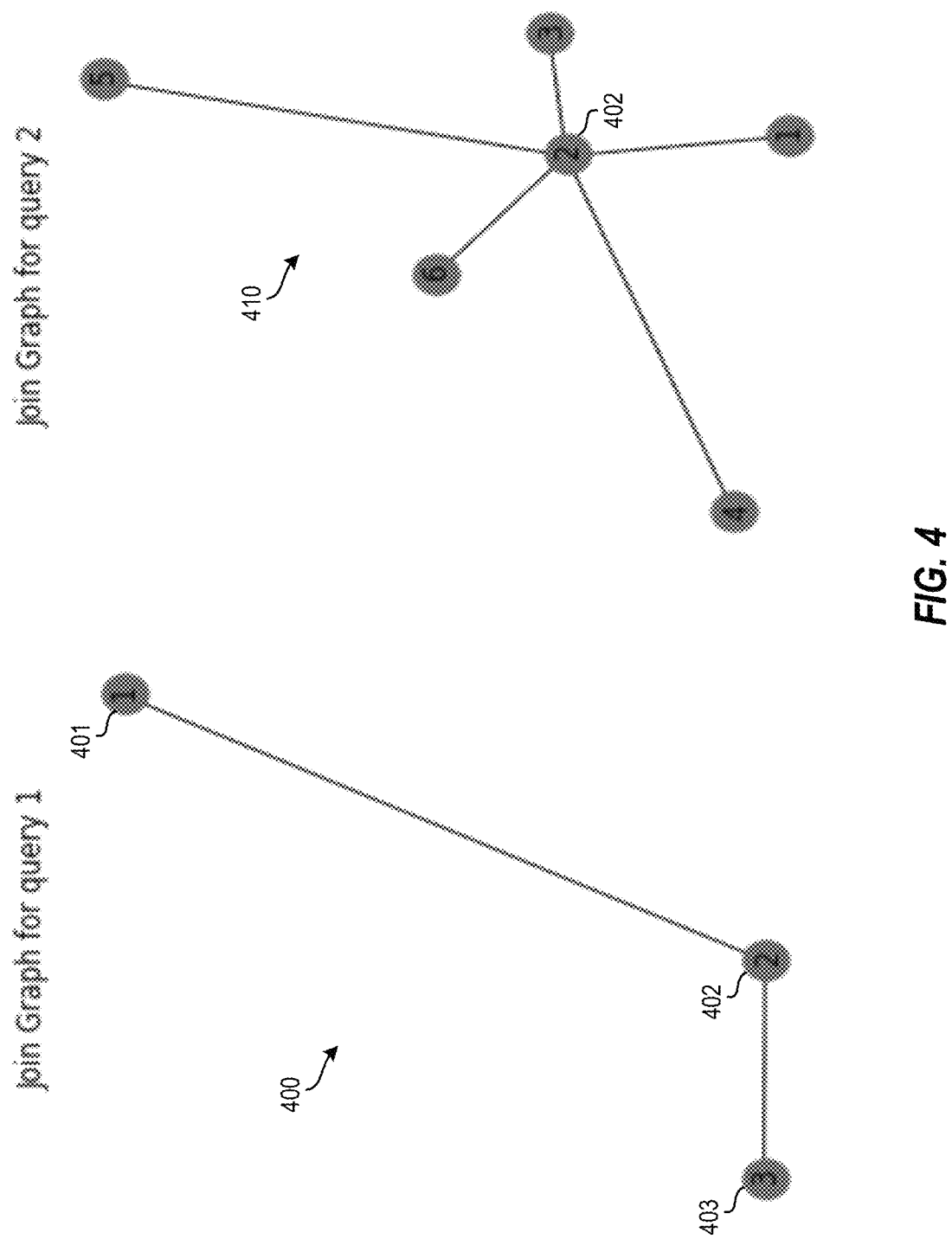
FIG. 4 depicts query graphs according to one or more embodiments described herein.

FIG. 4 depicts query graphs 400, 410 according to one or more embodiments described herein. The query graphs 400, 410 can be used during training 202 to train the trained model 218 and/or to perform inference 204 using the trained model 218. Training 202 and inference 204 are now described in more detail with reference to the query graphs 400, 410 but are not so limited.

According to one or more embodiments described herein, estimating cardinality for a query is a regression problem where the cardinality of the query graph (e.g., one or more of the query graphs 400, 410) is predicted. The query graph can represent a complete query or sub-portions of the query, such us different permutations of joins as enumerated by a query optimizer. According to one or more embodiments described herein, any regression machine learning model can be used. The query graph is what the trained model 218 is learning along with the true cardinality of the query. The target variable of the trained model 218 can be the selectivity of the cartesian join. Learning the selectivity rather than the actual cardinality provides for the trained model 218 to have a normalized variable that can speed up the training 202 and increase the accuracy of the trained model 218. The selectivity can be transformed back to cardinality for the output. The query graph can represent a sub-portion of the query plan. The target variable is the selectivity of the cartesian join.

For the trained model 218 to learn how to estimate the cardinality of a query, an effective list of features is defined to represent the properties of the query. The query graph (e.g., one or more of the query graphs 400, 410) includes a graph, a vertex (or vertices), an edge (or edges), and a degree of a vertex.

Each query can be modeled as a graph G according to the following:
 G=$\{V, E, D\}$ V: is a finite set of vertices
 G=$\{V, E, D\}$ V: is a finite set of vertices
 E$\subseteq$ V×V is a set of edges. D: denotes a set of multidimensional features
 E$\subseteq$ V×V is a set of edges. D: denotes a set of multidimensional features A vertex is a graph node that represents a database relational table. Adjacent vertices are tables connected by an edge. An edge is undirected line that represents a binary join connecting two tables. A degree of a vertex represents the number of tables joining a given vertex.

The join operation has a binary nature (e.g., only join two tables at a time). Each join can be represented by two vertices connected by an undirected edge. For example, the query graph 400 represents a first query. In this example, the query graph 400 includes three vertices 401, 402, 403, which are connected by edges as shown. The three vertices 401-403 indicate that the query references three tables. The query graph 410 represents a second query and includes six vertices 411, 412, 413, 414, 415, 416 connected by edges as shown. The six vertices 411-406 indicate that the query references six tables. In cases where the query has only one table, a self-joining node can be used to represent a graph with a single table.

According to one or more embodiments described herein, for any given query graph G, there are at least |T|−1 edges, where |T| represents the number of tables. The query space is bounded between +1 and −1 values. Limiting the space helps to train the trained model 218 with an already normalized range of values, which can be adjusted to accommodate a large number of tables in each query. How to place the nodes in such a graph space is now described.

The generation of the query graph (e.g., one or more of the query graphs 400, 410) is based on the number of tables provided in the query and the join columns. The coordinates of each node can represent some features that describe the base tables. Properties of the edges can be used to depict aspects of the join. For example, the line weight and the length of the edges can describe the join columns for each of the binary nodes and can represent other properties such as the type of join. For example, the direction of the edge can represent the type of join where no direction indicates an inner join, a single direction represents a left outer join or a right outer join with the arrow pointing at the null producing side (e.g., T1→T2 describes T1 LOJ T2), and a bi-directional edge represents a full outer join (e.g., T1< >T2 describes T1 FOJ T2). According to one or more embodiments described herein, features of each node can be the base table selectivity after applying the local predicates, the total selectivity of the top frequent values, and/or any other features that demonstrate the effects of applying the local predicates on the base table cardinality.

Building a query graph (e.g., one or more of the query graphs 400, 410) is now described. To build a query graph, nodes and edges are created, an initial position for each of the nodes is determined, and the node positions are then refined/optimized.

Figure 5:
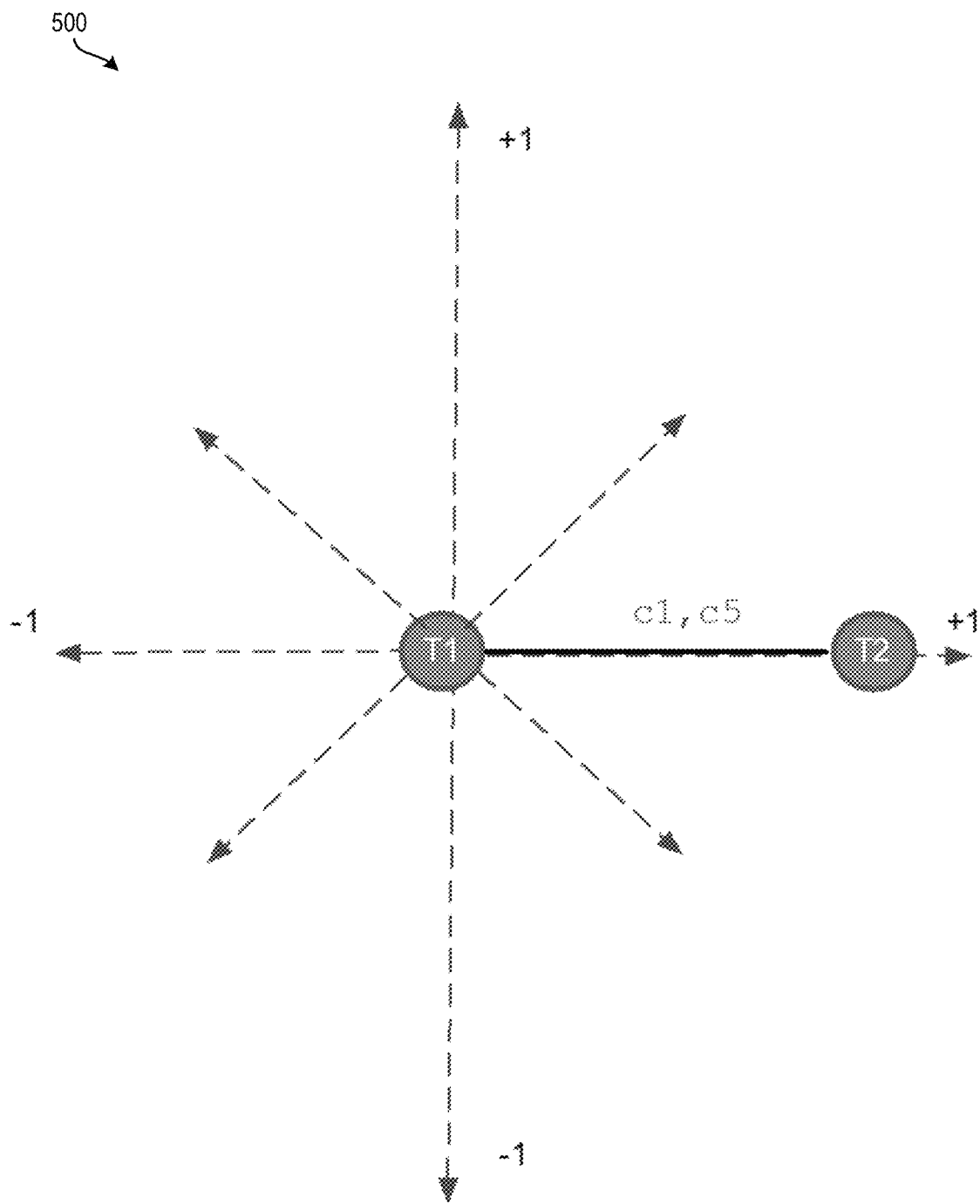
FIG. 5 depicts a space graph showing two tables with their join columns according to one or more embodiments described herein.

Creation of nodes and edges is now described with reference to FIG. 5, which depicts a space graph 500 showing two tables with their join columns according to one or more embodiments described herein. Each group of join columns between any two nodes are treated as one entity of the join features. For example, if there is a join between a first table $T_1$ and a second table $T_2$ on the following columns: $T_1 \cdot c_1 = T_2 \cdot c_1$ and $T1 \cdot c_5 = T_2 \cdot c_5$, the nodes in the graph are created, as shown in FIG. 5. The edge between the first table $T_1$ and the second table $T_2$ represents the join columns. According to an example, the line weight or styling (e.g., dashes) of the edge can represent the operator between the join columns: inner join, outer join, etc., where different line weights or styling represent different types of joins.

Figure 6:
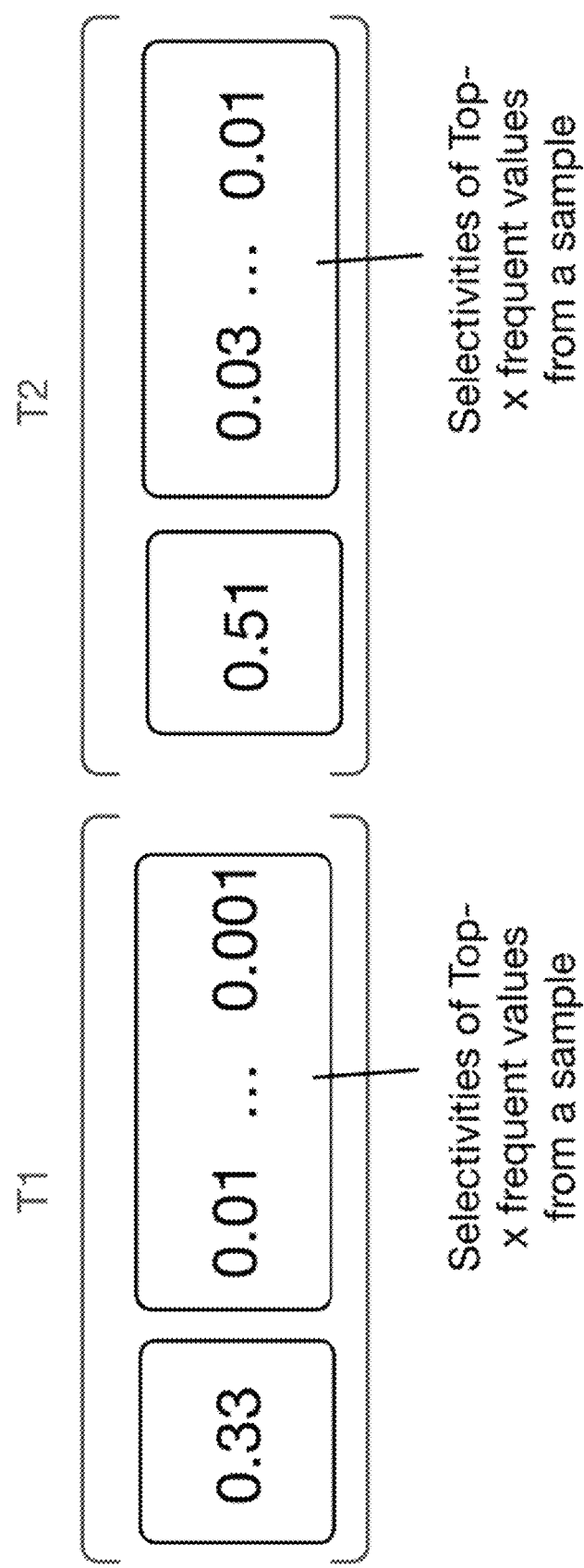
FIG. 6 depicts features of each node representing initial coordinates in the graph space.

Determining the initial position for each of the nodes is now described with reference to FIG. 6, which depicts features of each node (from FIG. 5) representing initial coordinates in the graph space. Each node has at least two dimensions representing the coordinates of the node in the graph. The base table cardinality along with the total selectivity of the top frequent values are effective to be used as initial positions for each node in the graph. For example, FIG. 6 shows, for each node for the first table $T_1$ and the second table $T_2$ from FIG. 5, initial positions in two dimensions. The initial position for the node of the first table $T_1$ is 0.33 and 0.01 . . . 0.001. The initial position for the node of the second table $T_2$ is 0.51 and 0.03 . . . 0.0.01. The first values (0.33 for $T_1$ and 0.51 for $T_2$) represent the selectivity of the base table cardinality after applying the local predicates. The second values (0.01 . . . 0.0.001 for $T_1$ and 0.03 . . . 0.01 for $T_2$) represent the total selectivity of the top-x frequent values. The second values are useful to determine if applying the local predicates has changed the selectivity of any of the highly skewed values, if any. According to one or more embodiments described herein, the total selectivity of the top-x values is computed from randomly collected samples. According to one or more embodiments described herein, the total selectivity of the top-x values is computed from some predefined materialized samples or the table previously collected stats. According to an example, a sample size could be between 2000 and 5000 rows for each of the tables. In some cases, such as for smaller tables, sampling may be skipped.

Figure 7:
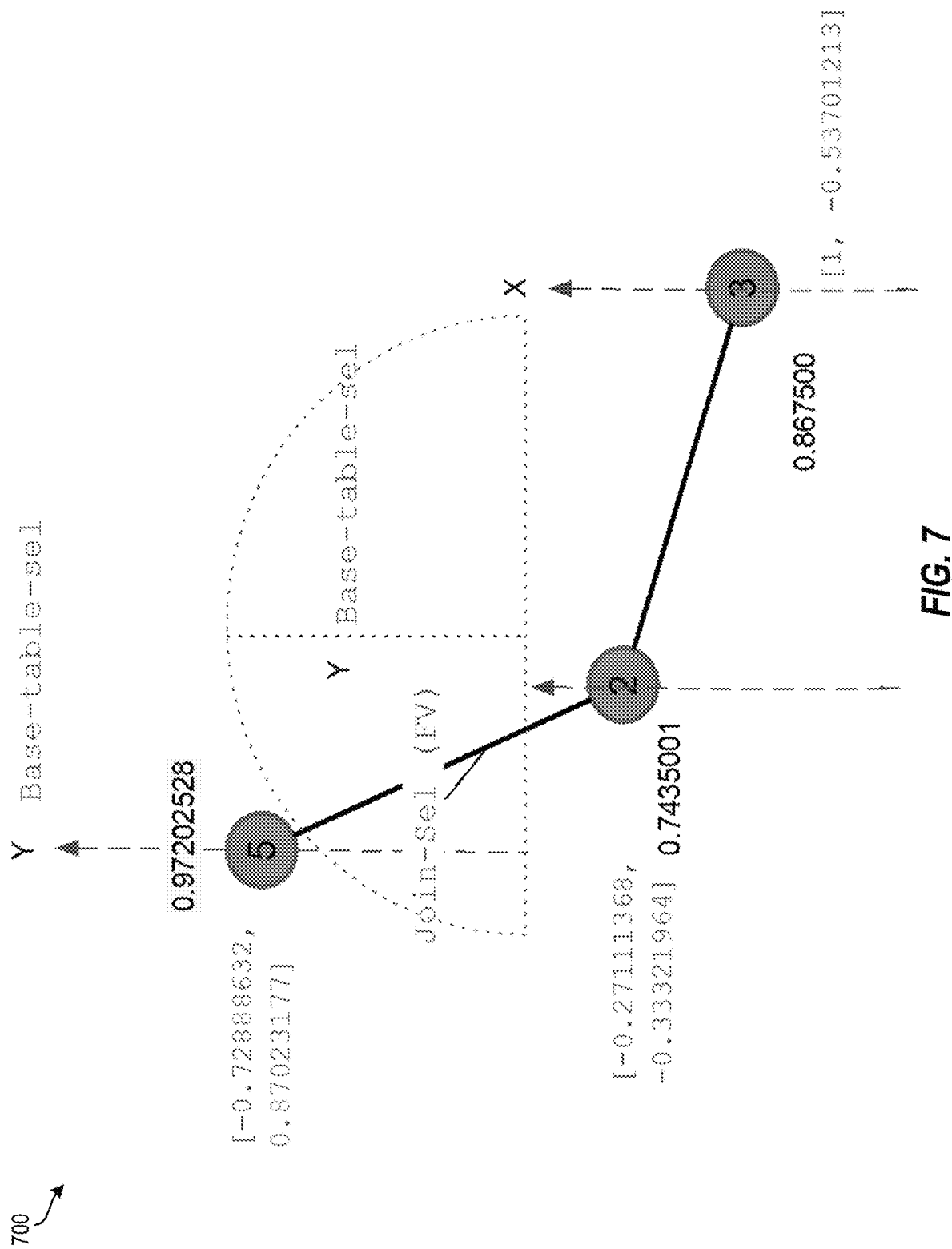
FIG. 7 depicts a resulted query graph with optimized node positioning for a three-table query according to one or more embodiments described herein.

Optimizing node positions is now described with reference to FIG. 7, which depicts a resulted query graph 700 with optimized node positioning for a three-table query according to one or more embodiments described herein. Relying on the query graph to represent the query and then using the underlying distribution properties introduces a number of challenges. First, ensuring that the graph has the same representation given the same circumstances (e.g., the same tables, the same joins, and the same local predicates with no changes in the actual distributions). Second, ensuring that the nodes are not positionally overlapping. Third, generalizing the query graph to avoid encoding the table names, predicates, and joins to be able to handle unseen tables, changing data in tables and queries with unseen predicates, and/or the like, including combinations and/or multiples thereof. To address these challenges, one or more embodiment described herein provide for optimizing the positioning of nodes in the query graph given the initial positions described herein. One possible approach for optimizing the positioning of the nodes in the query graph is to use the optimization algorithm described in "Graph drawing by force-directed placement." Software: Practice and experience 21.11 (1991): 1129-1164 by Fruchterman, Thomas MJ, and Edward M. Reingold. This approach computes the attractive forces between adjacent vertices along with the repulsive forces of the vertices in the query graph. FIG. 7 shows the resulted query graph 700 of three-tables query using optimization. According to one or more embodiments described herein, additional dimensions can be added to the query graph representing the join selectivity or features can be included in the node coordinates generated by the optimization algorithm. Expressions over columns may also be encoded and added to the properties.

According to one or more embodiments described herein, additional dimensions to further optimize the positioning of the nodes can be considered: the ratio of the table sizes without any predicates, the ratio of the distinct values, and the selectivity of the local predicates on an actual join sample.

In order to train the trained model 218 to generalize on unseen tables, the ratio of the table size of the child to the parent node can be added. This ratio provides for demonstrating how relatively big the tables initially were before the join.

The ratio of distinct values provides for determining the underlying distribution of the join. The distinct values between the nodes provides for determining whether the relationship is a primary-foreign key or whether the joins are between two primary keys.

The selectivity of the join samples determines the effects of the predicates on the actual join samples. For example, for each unique join, the selectivity of the predicates can be measured on a 2000-row collected sample. The sample is not joined, which could result in a 0-tuple problem on the actual join of the nodes.

Figure 8:
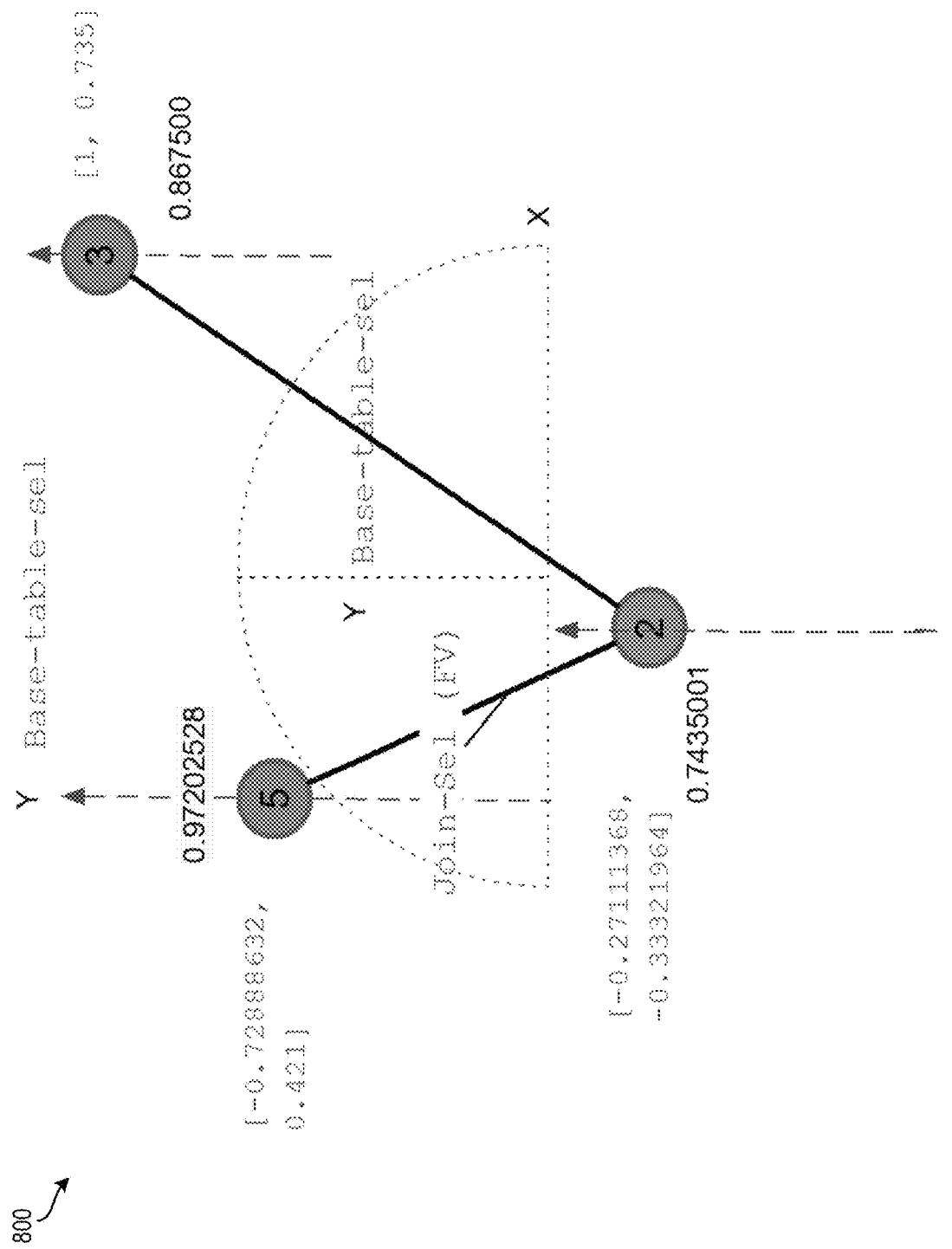
FIG. 8 depicts a resulting query graph with updated positions after optimization according to one or more embodiments described herein.

FIG. 8 depicts a resulting query graph 800 with updated positions according to one or more embodiments described herein. In this example, the resulting query graph 800 is an updated version of the resulted query graph 700 of FIG. 7. The resulting query graph 800 includes an updated position of the y-axis with the selectivity of predicates on the join samples. Particularly, the resulted query graph 700 was generated after using the optimization algorithm as described herein, and the resulting query graph 800 shows the updated position of the nodes using the selectivity of the join samples.

Figures 9A, 9B:
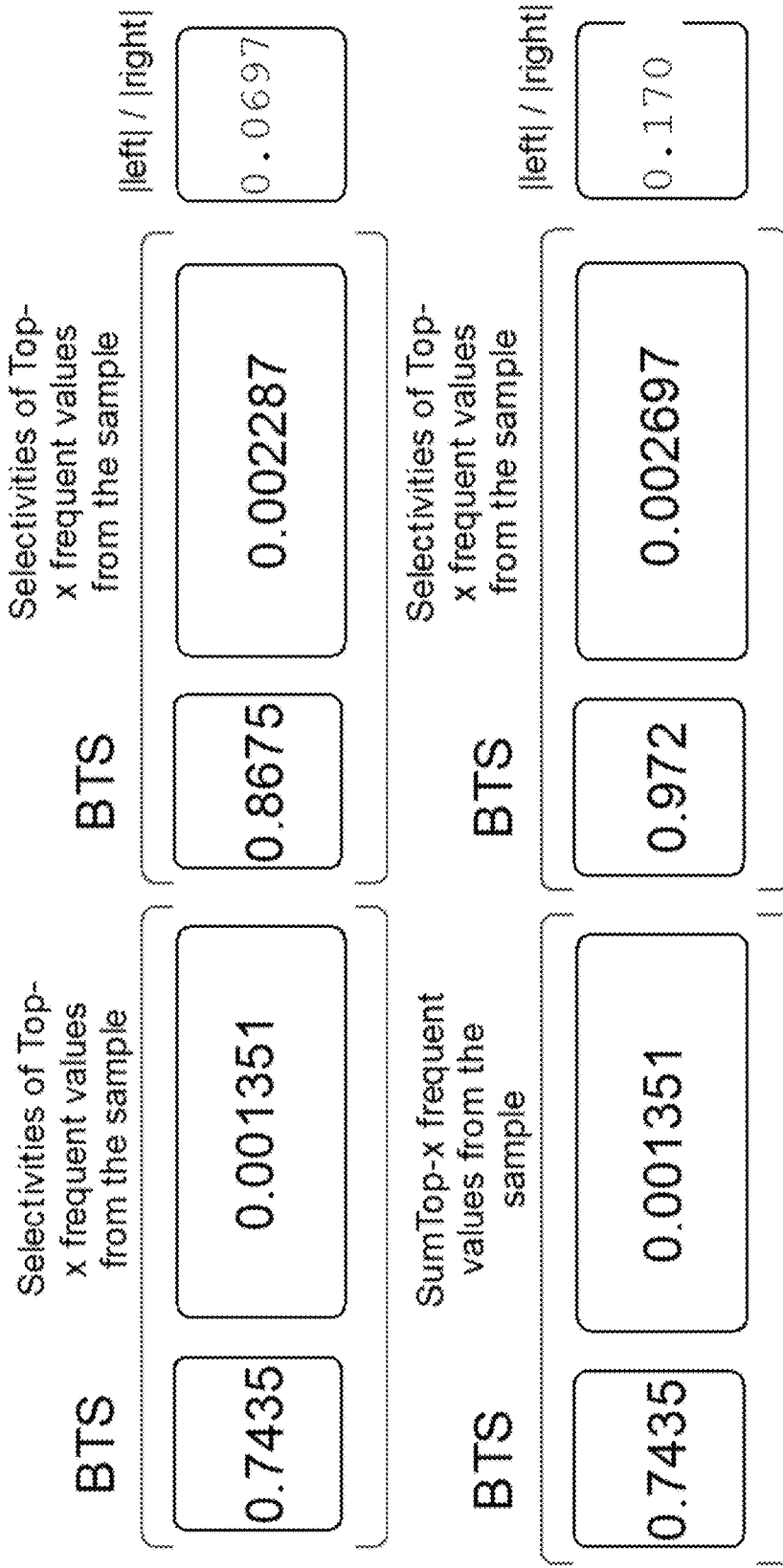
FIGS. 9A, 9B, and 9C together depict an example of building a query graph for a given query according to one or more embodiments described herein.
Figure 9C:
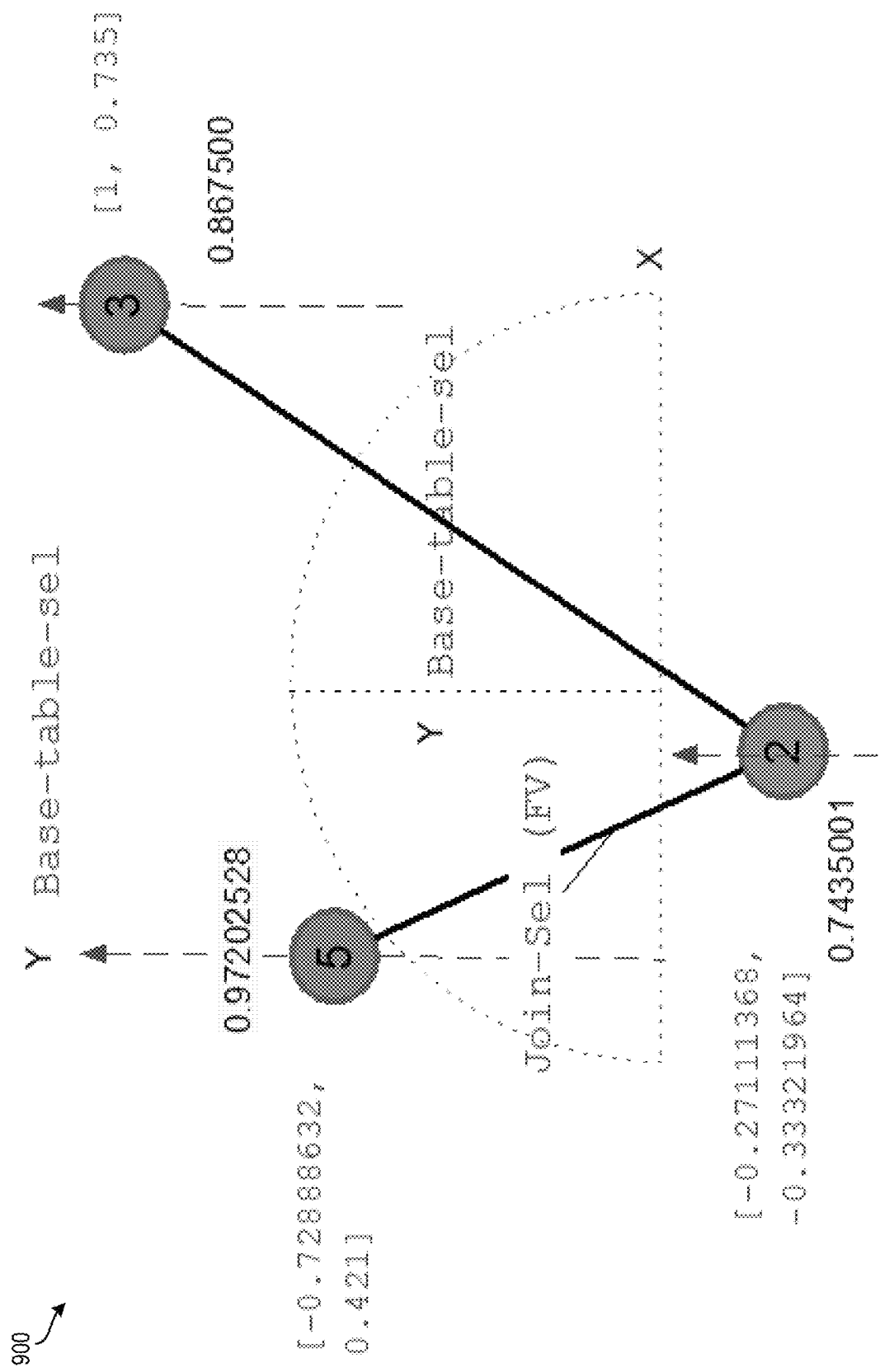

FIGS. 9A, 9B, and 9C together depict an example of building a query graph for a given query according to one or more embodiments described herein. In this example, the inputs to the trained model 218 are the features of each query. Examples of the features include the base table selectivity of each node, the coordinates of each node (x,y), which are generated using the techniques described herein. FIG. 9A depicts a sample query 900, according to one or more embodiments described herein. The sample query 900 uses, for example purposes, the IMDb. FIG. 9B depicts features of each node (from FIG. 9C) representing initial coordinates in the graph space. In this example, the base table attributes (BTA) include base table selectivity (e.g., accounting for local predicates) and selectivity of top frequency values (e.g., representing data distribution). The processing system can normalize coordinates to generalize the graph, such as using the Fruchterman and Reingold algorithm as described herein. The join features utilize ratio of table size, ratio of distinct values, and/or selectivity of predicates on a sample of the join as described herein. FIG. 9C depicts a query graph representation 902 of the sample query 900 that runs on the Internet Movie Database (IMDb).

Figure 10:
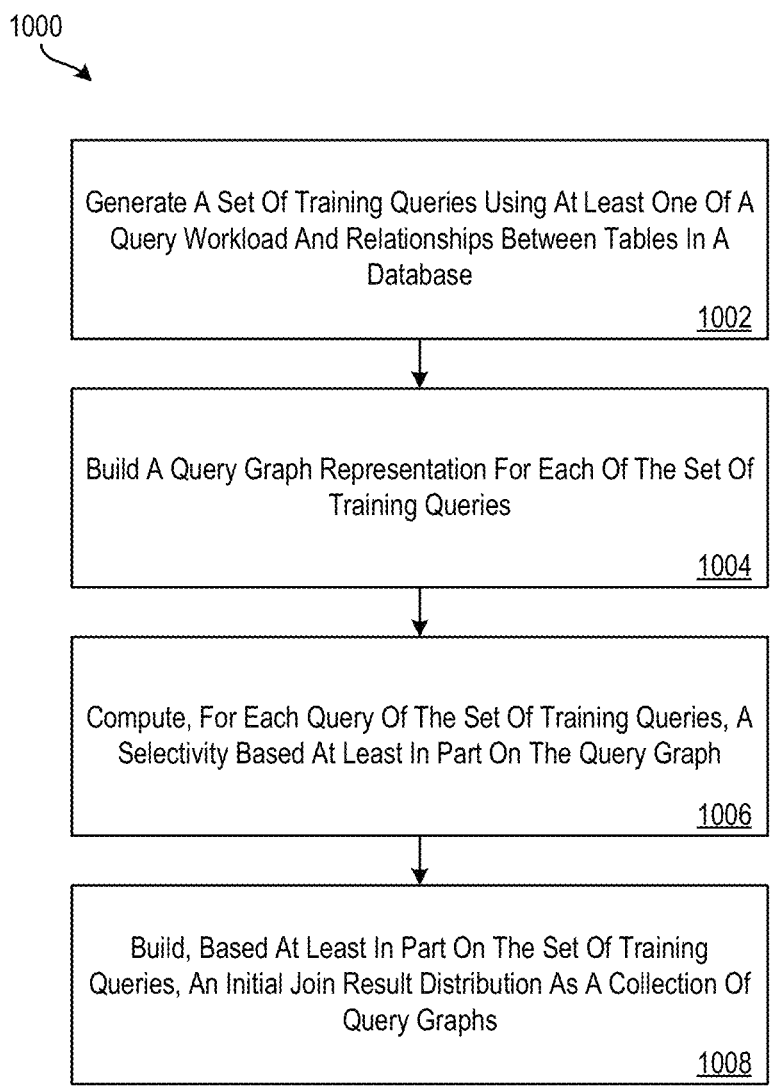
FIG. 10 depicts a flow diagram of a method for training a machine learning model to estimate cardinality for a query using query graphs according to one or more embodiments described herein.

FIG. 10 depicts a flow diagram of a method for training a machine learning model to estimate cardinality for a query using query graphs according to one or more embodiments described herein. The method 1000 can be performed by any suitable system, environment, and/or device, such as the computing environment 100, the machine learning training and inference system 200, and/or the like, including combinations and/or multiples thereof. The method 1000 is now described in more detail with reference to at least FIG. 2 but is not so limited.

At block 1002, the processing system generates training queries from a query workload or generates training queries based on relationships between tables in a database (e.g., referential integrity constraints can be pre-defined or discovered), and/or receives such training queries. At block 1004, using a query from the training queries, the processing system builds a query graph using an input vector that anonymizes tables in the database by using a representation of characteristics of the database. For example, building the query graph representation for each of the training queries includes using an input vector that anonymizes tables by using a representation of characteristics and providing selectivity as a desired output (e.g., the position of the nodes can be based on geometry rules established in the query graph representation). At block 1006 the processing system provides (e.g., computes) a selectivity as a desired output (e.g., using the representation of the query as the graph). At block 1008, the processing system builds, from the training queries, an initial join result distribution as a collection of query graphs.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    training a machine learning model by:
        generating a set of training queries using at least one of a query workload and relationships between tables in a database;
        building a query graph for each of the set of training queries;
        computing, for each training query of the set of training queries, a selectivity based at least in part on the query graph; and
        building, based at least in part on the set of training queries, an initial join result distribution as a collection of query graphs;
    compiling new queries in a new query workload using input including at least one change selected from a group consisting of new queries based on workloads, new tables, and changes to data; and
    performing retraining the machine learning model using the new query workload to create updates and updating the collection of query graphs using the updates.

2. The computer-implemented method of claim 1, wherein building the query graph for each of the training queries comprises using an input vector that anonymizes tables by using a representation of characteristics and providing the selectivity as a desired output.

3. The computer-implemented method of claim 1, further comprising, subsequent to training the machine learning model, performing inference using the machine learning model.

4. The computer-implemented method of claim 3, wherein performing the inference comprises:
    building a query graph for each combination of joins in a query; and
    identifying a best fit among the collection of query graphs to generate an associated cardinality estimate.

5. The computer-implemented method of claim 4, wherein computing the join cardinality comprises enumerating different permutations for a same set of N tables.

6. The computer-implemented method of claim 5, wherein computing the join cardinality comprises computing intermediate cardinalities with a subset of tables for each join order enumerated, wherein the machine learning model is called with the subsets of tables and local predicates.

7. The computer-implemented method of claim 1, further comprising performing continuous training on the machine learning model.

8. A system comprising:
a memory comprising computer readable instructions; and
a processing device for executing the computer readable instructions, the computer readable instructions controlling the processing device to perform operations comprising:
training a machine learning model by:
generating a set of training queries using at least one of a query workload and relationships between tables in a database;
building a query graph for each of the set of training queries;
computing, for each training query of the set of training queries, a selectivity based at least in part on the query graph; and
building, based at least in part on the set of training queries, an initial join result distribution as a collection of query graphs;
compiling new queries in a new query workload using input including at least one change selected from a group consisting of new queries based on workloads, new tables, and changes to data; and
performing retraining the machine learning model using the new query workload to create updates and updating the collection of query graphs using the updates.

9. The system of claim 8, wherein building the query graph for each of the training queries comprises using an input vector that anonymizes tables by using a representation of characteristics and providing the selectivity as a desired output.

10. The system of claim 8, wherein the operations further comprise, subsequent to training the machine learning model, performing inference using the machine learning model.

11. The system of claim 10, wherein performing inference comprises:
building a query graph for each combination of joins in a query; and
identifying a best fit among the collection of query graphs to generate an associated cardinality estimate.

12. The system of claim 11, wherein computing the join cardinality comprises enumerating different permutations for a same set of N tables.

13. The system of claim 12, wherein computing the join cardinality comprises computing intermediate cardinalities with a subset of tables for each join order enumerated, wherein the machine learning model is called with the subsets of tables and local predicates.

14. The system of claim 8, wherein the operations further comprise performing continuous training on the machine learning model.

15. A computer program product comprising a computer readable storage medium having program instructions embodied therewith, the program instructions executable by a processor to cause the processor to perform operations comprising:
training a machine learning model by:
generating a set of training queries using at least one of a query workload and relationships between tables in a database;
building a query graph for each of the set of training queries;
computing, for each training query of the set of training queries, a selectivity based at least in part on the query graph; and
building, based at least in part on the set of training queries, an initial join result distribution as a collection of query graphs;
compiling new queries in a new query workload using input including at least one change selected from a group consisting of new queries based on workloads, new tables, and changes to data; and
performing retraining the machine learning model using the new query workload to create updates and updating the collection of query graphs using the updates.

16. The computer program product of claim 15, wherein building the query graph for each of the training queries comprises using an input vector that anonymizes tables by using a representation of characteristics and providing the selectivity as a desired output.

17. The computer program product of claim 15, wherein the operations further comprise, subsequent to training the machine learning model, performing inference using the machine learning model.

18. The computer program product of claim 17, wherein performing the inference comprises:
building a query graph for each combination of joins in a query; and
identifying a best fit among the collection of query graphs to generate an associated cardinality estimate.

19. The computer program product of claim 18, wherein computing the join cardinality comprises enumerating different permutations for a same set of N tables, wherein computing the join cardinality comprises computing intermediate cardinalities with a subset of tables for each join order enumerated, wherein the machine learning model is called with the subsets of tables and local predicates.

20. A computer-implemented method comprising:
training a machine learning model by:
generating a set of training queries using at least one of a query workload and relationships between tables in a database;
building a query graph for each of the set of training queries;
computing, for each training query of the set of training queries, a selectivity based at least in part on the query graph; and
building, based at least in part on the set of training queries, an initial join result distribution as a collection of query graphs;
subsequent to training the machine learning model, performing inference using the machine learning model by:
computing a join cardinality for each join statement of a query; and
identifying a best fit among the collection of query graphs to generate an associated cardinality estimate; and
performing continuous training on the machine learning model by:
compiling new queries in a new query workload using input including at least one change selected from a group consisting of new queries based on workloads, new tables, and changes to data; and
updating the collection of query graphs.

21. A computer program product comprising a computer readable storage medium having program instructions embodied therewith, the program instructions executable by a processor to cause the processor to perform operations comprising:
- training a machine learning model by:
  - generating a set of training queries using at least one of a query workload and relationships between tables in a database;
  - building a query graph for each of the set of training queries;
  - computing, for each training query of the set of training queries, a selectivity based at least in part on the query graph; and
  - building, based at least in part on the set of training queries, an initial join result distribution as a collection of query graphs;
- subsequent to training the machine learning model, performing inference using the machine learning model by:
  - computing a join cardinality for each join statement of a query; and
  - identifying a best fit among the collection of query graphs to generate an associated cardinality estimate; and
- performing continuous training on the machine learning model by:
  - compiling new queries in a new query workload using input including at least one change selected from a group consisting of new queries based on workloads, new tables, and changes to data; and
  - updating the collection of query graphs.

* * * * *